United States Patent
Harvest et al.

[11] Patent Number: 6,134,901
[45] Date of Patent: Oct. 24, 2000

[54] METHOD OF SPEED CONTROL OF COMPRESSOR AND CONTROL ARRANGEMENT USING THE METHOD

[75] Inventors: Nils-Ole Harvest, Nordborg; Jan Aarestrup, Bjerringbro, both of Denmark

[73] Assignee: Danfoss Compressors GmbH, Flensburg, Germany

[21] Appl. No.: 09/284,329

[22] PCT Filed: Oct. 8, 1997

[86] PCT No.: PCT/DK97/00434

§ 371 Date: Apr. 9, 1999

§ 102(e) Date: Apr. 9, 1999

[87] PCT Pub. No.: WO98/15790

PCT Pub. Date: Apr. 16, 1998

[30] Foreign Application Priority Data

Oct. 9, 1996 [DK] Denmark ..................... 1110/96

[51] Int. Cl.$^7$ ........................ F25B 49/02
[52] U.S. Cl. ................... 62/228.4; 62/157; 62/229
[58] Field of Search ................ 62/228.1, 228.4, 62/157, 158, 231, 229, 226, 227

[56] References Cited

U.S. PATENT DOCUMENTS

| | | | |
|---|---|---|---|
| 4,831,313 | 5/1989 | Beilfuss | 388/822 |
| 5,074,120 | 12/1991 | Kitamoto | 62/228.4 X |
| 5,410,230 | 4/1995 | Bessler et al. | 62/228.4 X |
| 5,673,568 | 10/1997 | Isshiki | 62/228.4 |

*Primary Examiner*—Harry B. Tanner
*Attorney, Agent, or Firm*—Lee, Mann, Smith, McWilliams, Sweeney & Ohlson

[57] ABSTRACT

The invention concerns a method for speed control of a compressor, particularly a refrigeration compressor, and a control arrangement using this method. The speed control is effected in that a control arrangement varies the speed of an electric motor in dependence of simple ON/OFF signals from a thermostat placed in the surroundings to be cooled. The method according to the invention is characterized in that the starting speed of the compressor in a following ON period is reduced in relation to the final speed in the previous ON period. A continuous reduction of the starting speed of each ON period results in a self-regulating control giving long compressor operation times and an averagely low speed resulting in energy savings. A control arrangement using this method is also described.

10 Claims, 2 Drawing Sheets

METHOD OF SPEED CONTROL OF COMPRESSOR AND CONTROL ARRANGEMENT USING THE METHOD

The invention concerns a method for speed control of a compressor, particularly a refrigeration compressor, and a control arrangement using this method. The speed control is effected in that a control arrangement varies the speed of an electric motor in dependence of simple ON/OFF signals from a thermostat placed in the surroundings to be cooled.

The task on which the application is based, is the development of a control method and a control arrangement for a variable speed compressor, which is simple compared with the state of the art, and which can be fitted into existing constructions, e.g. refrigerators, which normally operated at fixed speed, but which can be changed to operation with variable speed by a quick intervention of a service technician. It is known to control the speed of compressors in dependence of the pressure conditions in the refrigeration system or in dependence of electronic temperature signals, but a common feature of these solutions is that they require relatively expensive pressure and temperature meters, and can only in rare cases directly replace existing solutions.

U.S. Pat. No. 5,410,230 describes a compressor control with an ON/OFF thermostat controlling the motor speed on the basis of the cyclic parameter, i.e. the duty cycle. The ON and OFF times of the thermostat are measured, and the duty cycle is calculated. If the duty cycle is lower than a predetermined value, the starting speed in the next cycle is reduced, and if it is higher, the starting speed is increased. When the thermostat is closed and the compressor operates, the motor speed is ramped upwards during the ON period, and correspondingly the motor speed is ramped downwards during the OFF period of the thermostat.

The control described in U.S. Pat. No. 5,410,230 is developed with a view to sawing a control component, e.g. a temperature controlling microprocessor, and in stead of having a price increasing component like a microprocessor measure and treat a temperature signal from an electronic thermostat, U.S. Pat. No. 5,410,230 uses a cheaper solution with an ON/OFF thermostat. However, the control method described is relatively complicated, as both ON and OFF times are measured, and at least three speed calculations are made during an ON/OFF cycle, viz. a first calculation of the starting speed, then a second continuous calculation of the speed in the ON period and a third calculation of the speed in the OFF period. Besides, the described method involving speed control during both the ON and the OFF period causes a relatively large energy consumption.

One of the purposes is thus to develop a control method and a control arrangement for a compressor having a lower energy consumption than the controls known from the state of the art.

Another purpose of the invention is to make a control method and a control arrangement for a compressor, which can be directly integrated in existing constructions, by which existing elements, such as an ON/OFF thermostat, are used for compressor speed control.

According to the invention, this is done by letting the conventional ON/OFF thermostat, which are already available in large numbers in the refrigerators, control the compressor speed so that the starting speed in a following ON period is reduced in relation to the final speed in a previous ON period by making the control arrangement subtract a predetermined speed from the final speed in the previous ON period and letting the result of this calculation be the starting speed in the following ON period, through which the speed is either increased or kept constant.

Using this control method enables an adaptive control, which automatically lets the motor operate at the speed required, which results in the refrigeration compressor working with averagely low speeds during long operation periods, which gives a low energy consumption. The operation or ON time is a function of the size of the subtracted rpm and the time it takes to increase the motor speed.

The invention describes in a first embodiment, how the speed in an actual ON period is measured, and compared by the control arrangement with the stored final speed from the previous ON period. If the actually measured speed is higher than the stored speed, the result of the comparison could be that the speed is increased faster than earlier.

To secure that the average motor speed is decreasing, the starting speed of the following ON period is reduced by a fixed value. It is possible to make the value to be subtracted variable, e.g. to fix it in dependence of the duration of the ON period, but a particularly simple solution is obtained by keeping the subtrahend constant from ON period to ON period. If, in the actual ON period, the thermostat breaks before the registered final speed of the previous ON period is reached, the starting speed in the following ON period will be lower than the starting speed in the actual ON period. If, however, the thermostat breaks after that the actual speed has exceeded the registered final speed of the previous ON period, the starting speed of the following ON period will be higher than the starting speed of the actual ON period.

The specification describes how a suddenly occurring refrigeration demand can be satisfied by setting the compressor motor speed at maximum, when a certain limit value is exceeded. This limit can be either an operation time or a speed change.

According to another embodiment of the invention a first time t1 and a second time t2 are introduced in addition to the fixed speed subtraction, at which times the control arrangement changes the compressor motor speed.

Variable speed control is effected using the method according to the invention. The variable speed control is characterised in that a control arrangement subtracts a predetermined speed from the final speed of a previous ON period and makes the result of this subtraction the starting speed in a following ON period, through which the speed is either increased or kept constant.

Also included in the invention is a control method, in which the ON time is measured and compared with the two times, t1 and t2, and the control arrangement reduces the motor speed, if the thermostat breaks before a first time t1, maintains the motor speed, if the thermostat breaks after the first time t1 but before a second time t2, but increases the motor speed, if the thermostat has not broken until the time t2.

In the following the invention is described on the basis of the following figures.

Figure 1:
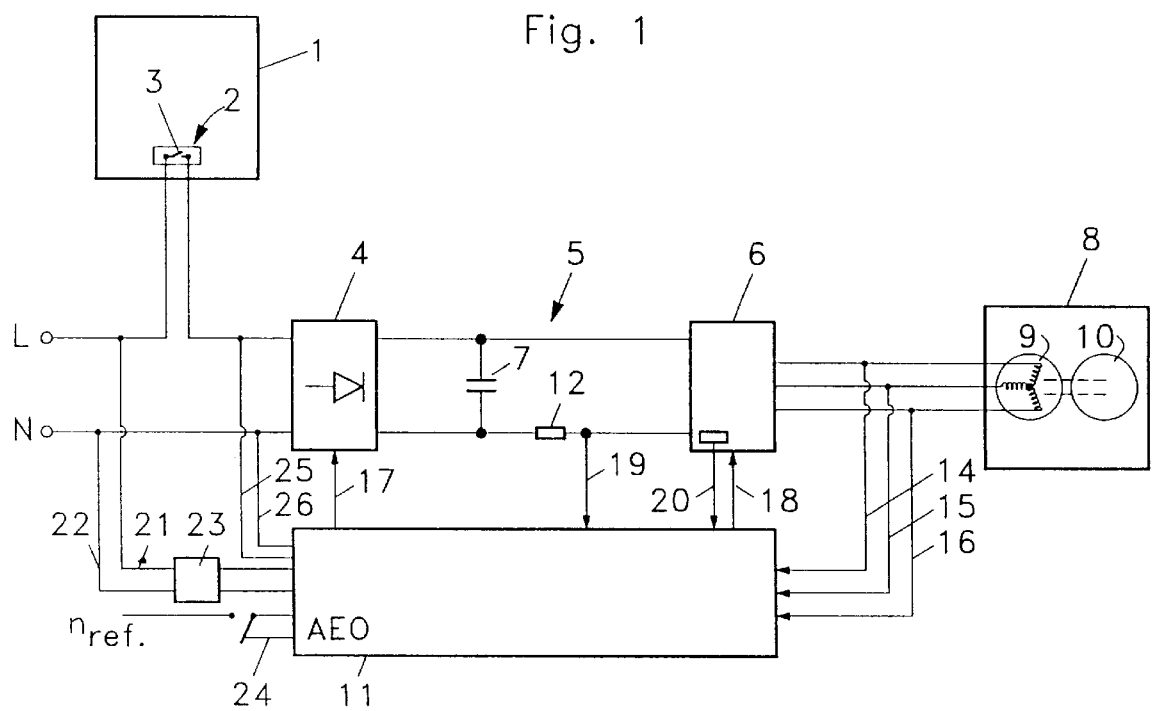
FIG. 1 shows a principal sketch of a compressor control arrangement

The control arrangement shown in FIG. 1 is advantageously fitted on the compressor unit 8 itself. As control and compressor unit are thus integrated, replacement of a fixed speed compressor by an electronically controlled variable speed compressor can easily be made.

In a room 1 to be cooled, a thermostat 2 is fitted, which breaks or makes the thermostat contact set 3 in dependence of the room temperature. The thermostat 2 is inserted in series with the supply mains. The power part of the control arrangement consists of the components 4, 5 and 6. A rectifier 4 converts the AC voltage of the mains to a DC voltage supplied to the intermediary circuit 5 containing an intermediary circuit capacitor 7. The inverter part 6 converts, in a known way, the DC voltage via pulse width modulation to an AC voltage supplied to the motor compressor unit 8, which comprises an electric motor 9 and a compressor 10. The compressor circulates refrigerant through a capacitor and an evaporator in a not shown refrigeration circuit with the purpose of controlling the temperature in room 1. A control arrangement 11 controls and monitors the motor/compressor unit control. The rectifier is controlled via the connection 17, so that the intermediary circuit voltage amplitude can vary. The inverter 6 is operated via the connection 18, comprising, in a known way, six wires connected to the switches in the inverter. On the three motor wires the back-EMF, produced in each phase on rotation of the permanent-magnetic rotor of the motor, are measured. The back-EMF signals are sent via the wires 14, 15, 16 to the control arrangement and used for determining the commutation times.

A temperature sensor 13 is arranged on the inverter cooling plate, and via connection 20 the signal is led to the control arrangement disconnecting the motor at a temperature of 100 degrees centigrade. A current measuring resistor 12 is inserted in the minus conductor of the intermediary circuit. Via connection 19 the control arrangement measures the current amplitude, and, in case of a too high amplitude, disconnects the motor. Via an AC-DC converter 23 and the connections 21 and 22 the control arrangement 11 is supplied with energy from the supply mains. A switch 24 has a first position, in which the control is self-regulating (AEO), and a second position enabling external speed control via a frequency signal ($n_{ref}$).

In the following it is assumed that via the switch 24 the control is in the Automatic Energy Optimisation (AEO) mode. The control works as follows, described on the basis of a first embodiment.

Figure 2:
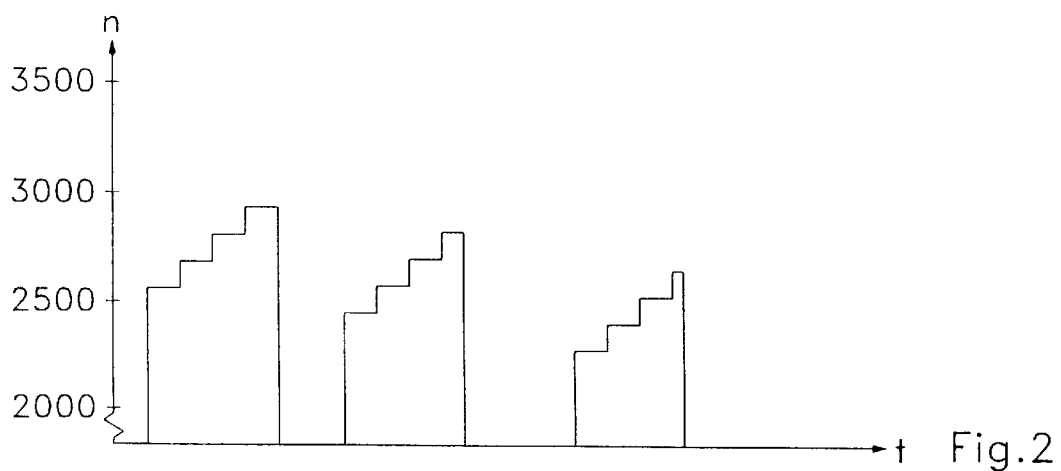
FIG. 2 shows a speed/time diagram of a first embodiment

A user has set the thermostat 2 at a desired temperature. On refrigeration demand the thermostat switch 3 makes. Making and breaking of the thermostat are detected by the control arrangement 11 by monitoring the mains voltage on conductors 25 and 26. In the first ON period the control arrangement lets the motor start at 2600 rpm, which is in the lower end of the working range 2000 to 3500 rpm. The speed is increased during the ON period, either continuously or in steps as shown in FIG. 2, until the thermostat breaks. During the period P1 the compressor has reached a final speed of 2900 rpm. When the thermostat breaks (OFF), the system is idle until the thermostat makes (ON) again. In the next period $P_2$ the compressor starts at a speed, which is lower than the final speed of the previous period, because a speed of e.g. 400 rpm has been subtracted from the final speed. With a starting speed of 2500 rpm the compressor is ramped up during the rest of the ON period, increasing the speed by 15 rpm each minute (in FIG. 2 the steps are shown larger to make the case clear). The speed is increased until the thermostat breaks or until the maximum speed of 3500 rpm is reached, which will happen after nearly 67 minutes operation. Then the speed is kept at 3500 rpm. If, during the ON period a limit value is exceeded, e.g. if the speed change during the ON period is higher than 800 rpm, without the thermostat breaking, the compressor motor is set at maximum speed. Thus a large refrigeration demand suddenly occurring is taken into consideration. The final speed of period P2 is 2800 rpm, so the starting speed of the next period P3 is 2400 rpm. FIG. 2 shows a situation with decreasing refrigeration demand, i.e. both final speed and starting speed are lower, when compared with the previous ON period. The inventive control automatically finds a working point with an averagely low speed and low energy consumption.

The speed ramp is described as a step ramp, but other ramp profiles are possible. E.g. the actually measured speed during the ON period can be compared with the final speed of the previous period, assuming that this speed is stored in a memory. If the actually measured speed exceeds the final speed of the previous period, the slope of the ramp in the actual ON period can be increased. On the basis of a comparison between the stored speed and the actually measured speed, it can be decided what the starting speed for the following ON period shall be and how the speed profile for the actual or the following period shall look.

Figure 3:
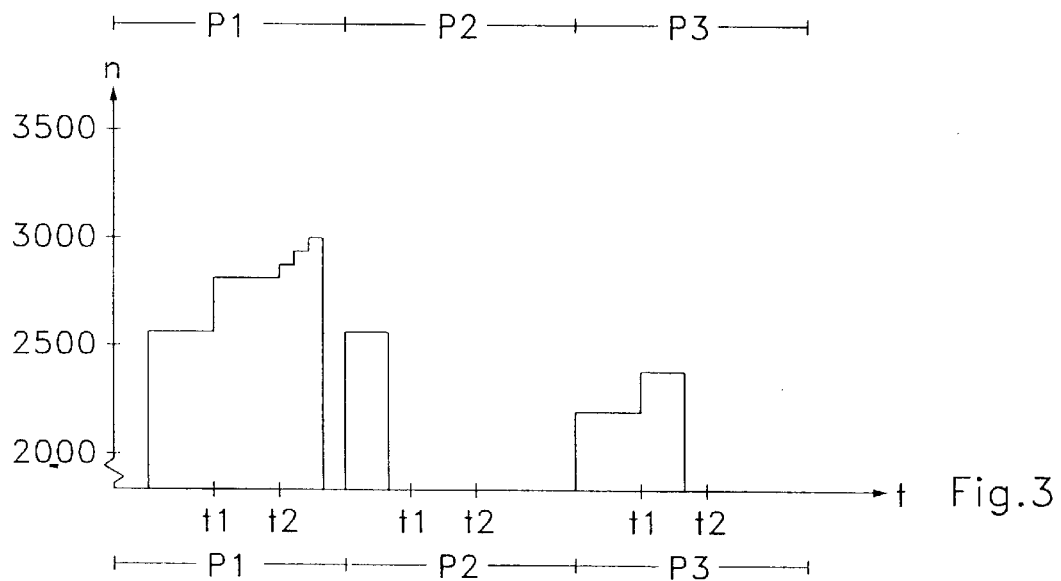
FIG. 3 shows a speed/time diagram of a second embodiment

In a second embodiment, shown in FIG. 3, a fixed speed is also subtracted at the beginning of each ON period. FIG. 3 shows the speed reference signal reaching the rectifier via the connection 17 (FIG. 1), controlling the intermediary circuit voltage to the desired level. In relation to the first embodiment, threshold values have been introduced in the ON period, in the form of two times t1 and t2, which can be fixed or proportional to the duration of the latest OFF period. The duration of the latest OFF period holds information about the time constant in the refrigeration system, and the times t1 and t2 can thus be expressed by a number of OFF periods.

A speed is subtracted from the latest generated speed reference, i.e. the final speed of the previous ON period, after which the compressor operates at a first speed. The control arrangement 11 comprises a counter counting towards a first time t1. The times are stored in a memory in the control arrangement. If the thermostat has not broken at the time t1, the speed is increased by a adding a predetermined value. If the thermostat has still not broken at the time t2, the speed is increased further, and this can happen stepwise through the remaining ON period or with one single speed step, after which a constant speed is maintained for the rest of the period. In the following period P2 the starting speed is again reduced by an amount, and it can be seen that the thermostat breaks before the time t1, which means decreasing refrigeration requirement. In the period P3 the starting speed in accordance with the invention is decreased in relation to the final speed in P2.

Reducing the starting speed for each ON period causes the compressor to run in long operation periods with a speed, which is on an average substantially lower than that of conventionally ON/OFF operated compressors, and this results in energy savings.

Figure 4:
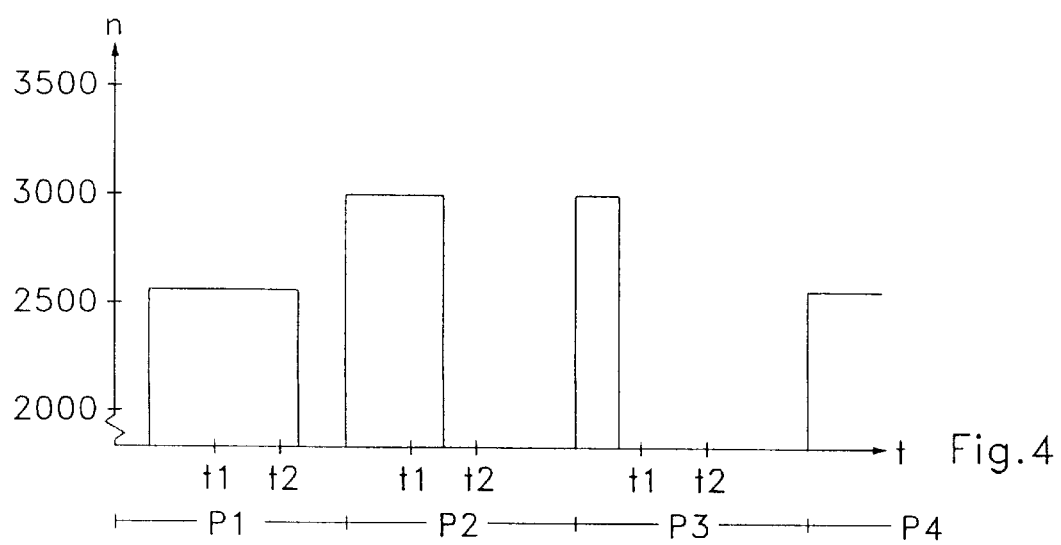
FIG. 4 shows a speed/time diagram of a third embodiment

FIG. 4 illustrates a control strategy similar to that of the second embodiment, also using two threshold values t1 and t2. The control arrangement reduces the motor starting speed in the following ON period, if the thermostat breaks before the first time t1, but increases the compressor speed, if the thermostat breaks after the time t2. If, however, the thermostat breaks between the times t1 and t2, the speed is unchanged. In the period P1 the compressor has just started, and therefore has an operation time exceeding the upper time limit t2. This means that the speed is increased from the start of the next period P2. As shown in the figure, the speed can be increased by one contribution from the start of the cycle, after which it is kept constant during the rest of the ON period, or the speed can be changed stepwise during the whole ON period. In period P2 the thermostat does not break until after the time t1 but before the time 2, therefore the starting speed in the following ON period is unchanged. In the period P3 the thermostat breaks before the time t1, and thus indicates reduced refrigeration requirement causing the starting speed in P4 to be reduced by an amount, which could be 400 rpm. As shown, the speed change does not take place until the following ON period, but of course the change can also be made in the actual ON period, as shown in embodiment 2.

What is claimed is:

1. Method for controlling motor speed in a compressor used in cooling an area such as a room, the compressor having an electronic control arrangement, which, from a thermostat having ON and OFF states, receives a signal depending on the temperature in the room to be cooled, and the compressor having a variable starting speed, the method comprising the steps of reducing the starting speed in a subsequent ON period in relation to the final speed in a previous ON period by making the control arrangement subtract a predetermined speed from the final speed in the previous ON period and using the result of this calculation as the starting speed in the subsequent ON period, and during the ON period either increasing or keeping the speed constant.

2. Method according to claim 1, in which the control arrangement stores the final speed from the previous ON period in a memory and measures the compressor speed during an actual ON period, compares of these two speeds, and determines the starting in the actual or the following ON period.

3. Method according to claim 1, in which the predetermined speed subtracted has a constant value such so that the starting speed in the subsequent ON period is lower than the starting speed in the previous ON period if the thermostat delivers an OFF state signal in the previous ON period before the actual compressor speed is equal to the starting speed in the previous ON period plus the constant value.

4. Method according to claim 1, including the step of setting the speed during an ON period at a maximum if speed change during this ON period exceeds a predetermined limit value.

5. Method according to claim 1, including the step of setting the speed during an ON period at maximum if total operation time during the ON period exceeds a fixed limit value.

6. Method according to claim 1, including the steps of increasing the speed at a first time t1 and then again at a second time t1.

7. Method according to claim 6, in which the speed is kept constant at a first speed until the time t1, whereafter the speed is raised and kept constant at a second speed until the time t2, after which the speed is increased at a constant rate.

8. Variable speed control for regulating the motor speed in a refrigeration compressor used in cooling an area such as a room, comprising an electronic control arrangement for receiving a temperature signal from a thermostat placed in the room to be cooled, the thermostat having ON and OFF states, the control arrangement having means to reduce the starting speed of the compressor in a subsequent ON period in relation to the final speed in the previous ON period by subtracting a predetermined speed from the final speed in the previous ON period, and using the result of this calculation as the starting speed in the following ON period.

9. Method for speed control of a motor in a compressor by means of an electronic control arrangement receiving a temperature signal from a thermostat having ON and OFF states, and in which the speed determined by the control arrangement is a function of the duration of at least one of the ON period and OFF period, comprising steps of reducing the motor speed if the thermostat sends an OFF state signal before a first time t1, maintaining the motor speed if the thermostat sends an OFF state signal after the first time t1 but before a second time t2, and increasing the motor speed if the thermostat has not sent an OFF state signal by the time t2.

10. Method according to claim 9, including the further steps of keeping the motor speed constant in the ON period and changing the motor speed in a subsequent ON period.

* * * * *